Jan. 12, 1926.
E. O. ELLIOTT
1,569,732
CRANK AXLE COUNTERBALANCE
Filed May 24, 1924
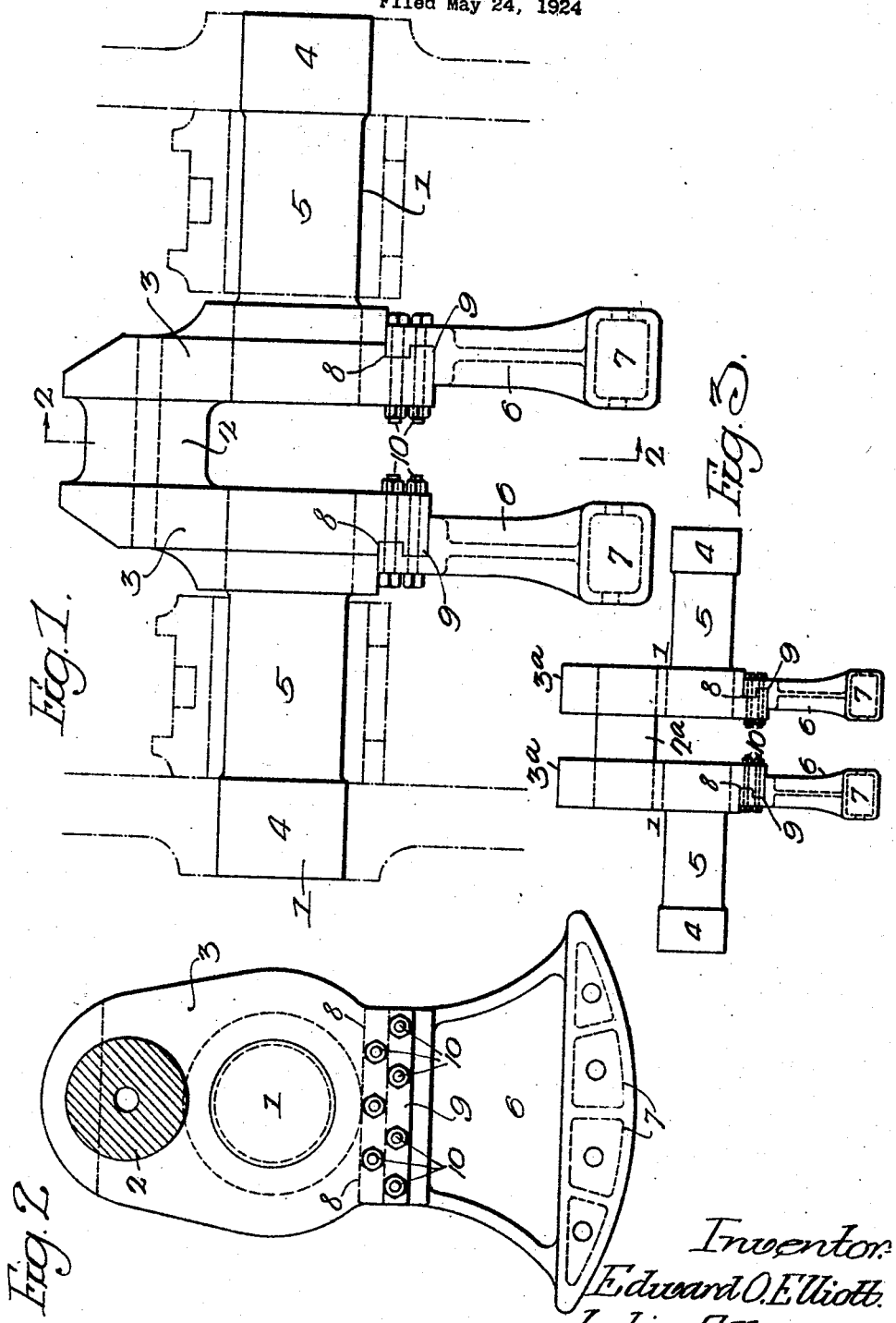
Inventor:
Edward O. Elliott.
by his Attorneys.
Howson & Howson Patented Jan. 12, 1926.

1,569,732

UNITED STATES PATENT OFFICE.

EDWARD O. ELLIOTT, OF PHILADELPHIA, PENNSYLVANIA.

CRANK-AXLE COUNTERBALANCE.

Application filed May 24, 1924. Serial No. 715,763.

*To all whom it may concern:*

Be it known that I, EDWARD O. ELLIOTT, a citizen of the United States, residing in Philadelphia, Pennsylvania, have invented certain Improvements in a Crank-Axle Counterbalance, of which the following is a specification.

The object of my invention is to provide a crank axle of a three cylinder locomotive with counterbalance weights that are made separate from the crank axle, so as to reduce the waste of high grade steel used in the manufacture of crank axles.

In the accompanying drawing:

Fig. 1 is a side view of a crank axle illustrating my improvement;

Fig. 2 is a sectional view on the line 2—2, Fig. 1; and

Fig. 3 is a side view illustrating a modified form of crank axle.

The axle shown in the drawing is designed for a three cylinder locomotive. The crank 2 is at the centre of the axle 1 and is located between two cheeks 3. The portions 4 of the axle are shaped to receive the driving wheels of the locomotive, while the portions 5 are located in the bearing boxes, as shown by dotted lines in Fig. 1. The cheeks and crank are integral and are made of high grade material. The body portions of the axle are secured to the cheek sections 3 in the ordinary manner.

Secured to each cheek section 3 is a counterbalance 6 which is shaped as shown in Figs. 1 and 2 and has a hollow portion 7 that may be loaded with lead, or other suitable material, to provide the required weight to counterbalance the crank.

Each cheek is preferably grooved at 8 to receive a tongue 9, formed on the counterbalance. Bolts 10 extend through the counterbalance and cheek and firmly secure the counterbalance to the cheek, the tongue relieving the bolts of the shearing strains.

By the above construction, the size of the integral crank structure is materially reduced and, consequently, the ingot, or billet, need not be cut away and wasted to such an extent as when the counterbalance is made integral with the cheeks.

In Fig. 3, a modification is illustrated in which the cheeks $3^a$ are make separate from the crank $2^a$ and the counterbalances are attached to the cheeks in the same manner as in Fig. 1.

I claim:

1. The combination in a crank axle, of two cheek pieces spaced apart; a crank extending from one cheek piece to the other on one side of the axle, each cheek piece extending on the opposite side of the axle and having a transverse groove therein; a counterbalance for each cheek piece, each counterbalance having a transverse groove adapted to the groove in each cheek piece; and a series of transverse bolts securing the counter balance to the cheek pieces.

2. The combination in a crank axle, of two cheek pieces spaced apart; a crank extending from one cheek piece to the other on one side of the axle, each cheek piece extending on the opposite side of the axle and having a transverse groove; a counterbalance for each cheek piece, each counterbalance having a transverse groove adapted to the groove in each cheek piece; and two series of transverse bolts securing the counterbalances to the cheek pieces, one series of bolts extending through the tongue and groove and the other series of bolts extending through the cheek pieces and counterbalances beyond the grooves.

EDWARD O. ELLIOTT.